(12) United States Patent
Granger

(10) Patent No.: US 7,419,341 B2
(45) Date of Patent: Sep. 2, 2008

(54) MACHINING MECHANICAL PARTS WITH A HOLLOW CYLINDRICAL TOOL

(75) Inventor: Romain Granger, Lavardin (FR)

(73) Assignee: Romer, Montroie sur le Loir (FR)

( * ) Notice: Subject to any disclaimer, the term of this patent is extended or adjusted under 35 U.S.C. 154(b) by 255 days.

(21) Appl. No.: 11/475,525

(22) Filed: Jun. 27, 2006

(65) Prior Publication Data

US 2006/0291970 A1 Dec. 28, 2006

(30) Foreign Application Priority Data

Jun. 28, 2005 (FR) .................................. 05 06543

(51) Int. Cl.
*B23Q 11/00* (2006.01)
(52) U.S. Cl. ...................... 409/137; 408/58; 408/67; 83/100; 175/213; 173/198
(58) Field of Classification Search ................ 409/134, 409/135, 136, 137; 408/56, 57, 58, 59, 67, 408/204–209, 203.5; 83/100, 684, 686; 175/213; 173/71–73, 75, 64, 198; *B23B 47/34; B23Q 11/00, B23Q 11/02*
See application file for complete search history.

(56) References Cited

U.S. PATENT DOCUMENTS

| 2,919,901 | A |   | 1/1960 | Sandvig ....................... 255/50 |
| 3,382,743 | A |   | 5/1968 | Trevathan ...................... 77/69 |
| 3,690,780 | A | * | 9/1972 | Bjelland et al. ............... 408/58 |
| 3,842,713 | A |   | 10/1974 | Hamilton et al. ............ 409/132 |
| 4,036,308 | A | * | 7/1977 | Dellenberg .................... 173/75 |
| 4,711,609 | A |   | 12/1987 | Seefluth ....................... 408/68 |
| 5,487,630 | A | * | 1/1996 | Campian .................... 409/225 |

(Continued)

FOREIGN PATENT DOCUMENTS

DE          929 930       6/1955

(Continued)

OTHER PUBLICATIONS

Translation of the French Search Report dated Feb. 20, 2006.

*Primary Examiner*—Daniel W Howell
(74) *Attorney, Agent, or Firm*—McCormick, Paulding & Huber LLP

(57) ABSTRACT

The present invention relates to a device for machining mechanical parts by means of a hollow cylindrical tool presenting a distal end with a free edge that is shaped to perform machining when said tool is rotated about its axis. In accordance with the invention, the hollow cylindrical tool is fitted internally with a transverse member forming a shaving-breaker, and said hollow cylindrical tool is secured axially to a distal end of a hollow cylindrical spindle, said hollow cylindrical spindle being mounted to rotate about its own axis on a support plate, and being driven externally by rotary drive means mounted on said support plate, and said hollow cylindrical spindle having a proximal end facing and directly adjacent to a hollow cylindrical endpiece secured to said support plate and connected to a suction hose, such that the machining shavings can be evacuated internally by passing successively through the hollow cylindrical tool going round the transverse member forming a shaving-breaker, through the hollow cylindrical spindle, through the hollow cylindrical endpiece, and through the suction hose.

11 Claims, 5 Drawing Sheets

U.S. PATENT DOCUMENTS

| | | | |
|---|---|---|---|
| 6,216,798 B1 | 4/2001 | Riello et al. | 173/152 |
| 6,514,018 B2 * | 2/2003 | Martinez et al. | 408/14 |

FOREIGN PATENT DOCUMENTS

| | | | |
|---|---|---|---|
| DE | 200 09 411 U1 | | 9/2000 |
| EP | 855244 A2 | * | 7/1998 |
| EP | 1 093 897 A2 | | 4/2001 |
| JP | 61241008 A | * | 10/1986 |
| JP | 06055401 A | * | 3/1994 |
| JP | 2002166320 A | * | 6/2002 |

* cited by examiner

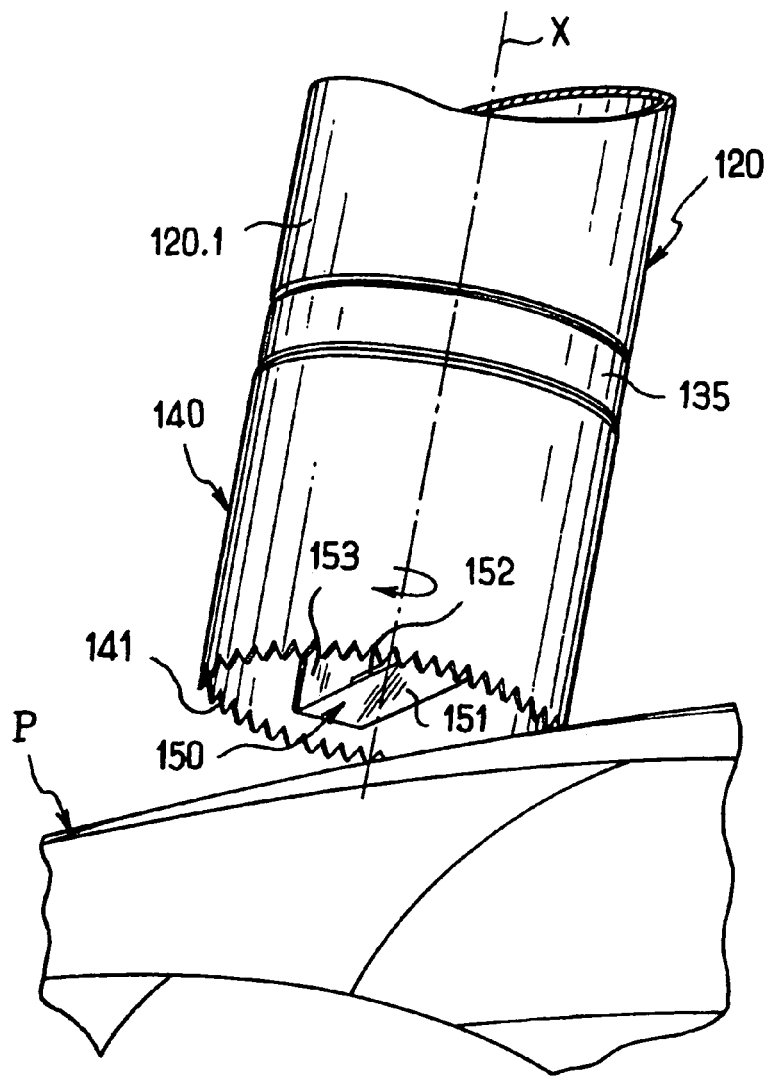
FIG_4
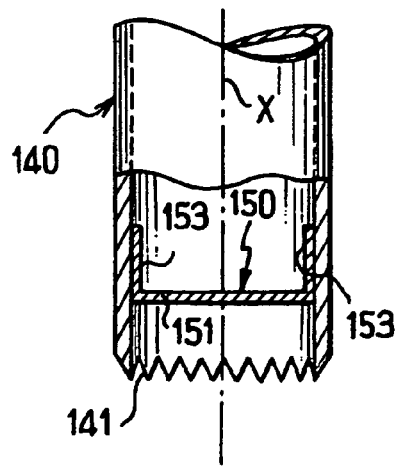
FIG_5
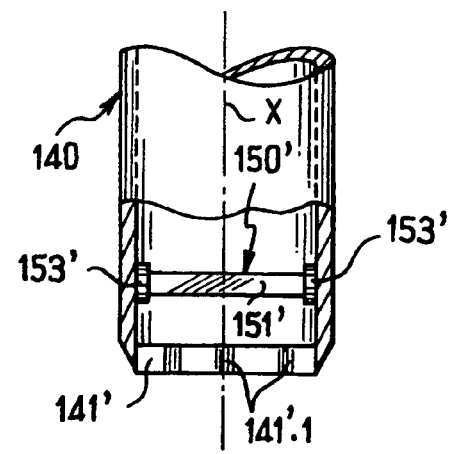
FIG_6

MACHINING MECHANICAL PARTS WITH A HOLLOW CYLINDRICAL TOOL

CROSS REFERENCE TO RELATED APPLICATIONS

Applicant hereby claims foreign priority benefits under U.S.C. § 119 from French Patent Application No. 05 06543 filed on Jun. 28, 2005, the contents of which are incorporated by reference herein.

FIELD OF THE INVENTION

The present invention relates to the field of machining mechanical parts by means of a hollow cylindrical tool presenting a distal end with a free edge that is shaped to implement a machining operation when said tool is rotated about its axis.

BACKGROUND OF THE INVENTION

It has been known for a very long time to machine mechanical parts by using a hollow cylindrical tool presenting a distal end with a free edge that is shaped to implement machining when said tool is driven in rotation about its axis, the free edge generally being shaped to carry a set of teeth for attacking the material of the mechanical part that is to be machined.

In the field of portable drills, proposals have already been made to remove swarf or shavings via a central channel of the drilling tool and the associated spindle (see for example patent document U.S. Pat. No. 4,711,609).

Other machine tools are sometimes fitted with a central suction system for shavings (see for example patent documents DE-C-929 930, U.S. Pat. No. 2,919,901, and DE-U-200 09 411).

For technological background, reference can also be made to patent documents U.S. Pat. No. 3,382,743 and EP-A-1 093 897.

The machining device used naturally depends on the type of mechanical parts concerned, in particular on their dimensions and above all the materials from which they are made. In this respect, making three-dimensional mechanical parts, e.g. life-sized models of motor vehicle bodywork parts, has led specialists in this technical field to abandon traditional materials such as wood and to turn instead to plastics materials, and in particular polystyrene.

It is thus common practice to make three-dimensional models of motor vehicle components, and in particular bodywork parts, starting from a blank made of polystyrene. In order to achieve a shape for the three-dimensional part that is very precise, it is necessary to undertake machining in which precision is under complete control.

To this end, it is present practice to use milling robots having a machining cutter that rotates at high speed, e.g. about 20,000 revolutions per minute (rpm), with milling being performed with high precision by the robot being moved under the control of a numerical control installation.

Unfortunately, such milling robots present two major drawbacks, that have not been overcome in satisfactory manner.

The first drawback is that of noise, the high speed of the spinning cutter leading to very high frequency noise and whistling that are particularly burdensome for nearby personnel, even though they generally wear helmets with sound protection, thereby de facto excluding the presence on site of other people, because of the discomfort caused.

The second drawback lies in generating relatively fine dust as a result of the milling passes, and removing such dust leads to practical problems inherent both to the size of the particles, and also to the electrostatic charge of said particles which stick to a greater or lesser extent to the surrounding equipment, and in particular to the hinged arm of the milling robot. The dust is thus difficult to remove, and in particular, it is not possible to conceive making use of the suction techniques that are traditionally to be found in installations for removing wood sawdust, using suction that is necessarily applied laterally because of the presence of the outlet shaft of the drive motor on the axis of the tool.

Finally, in addition to the two major drawbacks mentioned above, it should also be observed that the machining device fitted to the milling robot uses a drive motor that is adapted to the speed conditions required, and consequently constitutes a component that is both expensive and fragile. Finally, such motor drive also implies that the installation consumes a non-negligible amount of electrical power.

BRIEF SUMMARY OF THE INVENTION

The present invention seeks to devise a machining device making it easy to make three-dimensional mechanical parts while avoiding the above-mentioned drawbacks, and in particular avoiding generating high frequency noise or generating particularly adhesive machining dust.

Another object of the invention is to devise a machining device that is particularly suitable for working on solid mechanical parts made of polystyrene, in particular for the purpose of making three-dimensional models of motor vehicle components.

The above-specified problem is solved in accordance with the present invention by means of a device for machining mechanical parts by means of a hollow cylindrical tool presenting a distal end with a free edge that is shaped to perform machining when said tool is rotated about its axis, wherein the hollow cylindrical tool is fitted internally with a transverse member forming a shaving-breaker, and said hollow cylindrical tool is secured axially to a distal end of a hollow cylindrical spindle, said hollow cylindrical spindle being mounted to rotate about its own axis on a support plate, and being driven externally by rotary drive means mounted on said support plate, and said hollow cylindrical spindle having a proximal end facing and directly adjacent to a hollow cylindrical endpiece secured to said support plate and connected to a suction hose, such that the machining shavings can be evacuated internally by passing successively through the hollow cylindrical tool going round the transverse member forming a shaving-breaker, through the hollow cylindrical spindle, through the hollow cylindrical endpiece, and through the suction hose.

Thus, by means of such an arrangement, it is possible to machine three-dimensional parts, in particular solid polystyrene parts, while generating waste that is no longer constituted by fine dust particles, but by shavings having a size that is of the same order as that of a pea. These large shavings are then easily removed through the pipe formed by the tool, the spindle, the endpiece, and the suction hose. This achieves a result that is quite spectacular in terms of removing machining shavings, with there being practically no shavings in the environment outside the machining device. In addition, the presence of shavings that are much larger in size than the dust given off using conventional machining techniques makes it possible to reduce considerably the harmful effects due to static electricity on polystyrene particles.

Furthermore, because of the presence of the transverse member forming a shaving-breaker when the shavings produced during machining are in the form of flakes of large size or solid blocks likewise of considerable volume, it is possible to reduce the dimensions of such shavings so as to facilitate removal by means of suction at constant power without disturbing the stream of shavings moving along the inside of the passage inside the machine constituted by the tool, the spindle, the endpiece, and the suction hose.

In a first embodiment, the transverse member forming a shaving-breaker is constituted by a U-shaped strip with side limbs extending axially over the inside surface of the hollow cylindrical tool, and with a central limb in the form of a transverse blade for cutting shavings sucked into said tool.

In a variant, the transverse member forming a shaving-breaker is constituted by a bar extending diametrically inside the hollow cylindrical tool.

Also advantageously, the hollow cylindrical tool, the hollow cylindrical spindle, the hollow cylindrical endpiece, and the suction hose present substantially the same inside diameter, so as to form a removal duct that is essentially continuous for the machining shavings. The continuity of the removal duct formed in this way enables all of the machining shavings generated during machining to be sucked up regularly, without requiring high levels of electrical power for the motor-driven drive means.

Provision could also be made for the free edge of the hollow cylindrical tool to present a set of teeth, or in a variant to be essentially smooth with a cutting edge. Depending on the type of work required, the above-mentioned essentially smooth free edge may present a circumferential profile that is linear like a conventional cutter tool, or in a variant it may present a circumferential profile that is undulating so as to avoid any material sticking against the cutting chamfer.

As mentioned above, the machining device includes rotary drive means for rotating the hollow cylindrical spindle, which drive means are mounted on the support plate.

Provision could be made for the rotary drive means to be constituted by a motor mounted laterally on one side of the hollow cylindrical spindle, with a belt connecting said spindle to the outlet shaft of said motor. Such lateral mounting enables the hollow cylindrical spindle to be driven in rotation without interfering with the provision of the removal channel.

In a variant, provision could be made for the rotary drive means to be constituted by a motor of the type having a hollow shaft, which hollow shaft constitutes the hollow cylindrical spindle itself. In this configuration also, the hollow shaft constituted by the hollow cylindrical spindle forms part of the duct for removing machining shavings merely by applying suction inside said duct.

Finally, the machining device is advantageously mounted via its plate at the end of a hinged arm forming part of a numerically controlled machining robot.

Other characteristics and advantages of the invention appear more clearly in the light of the following description and the accompanying drawings relating to a particular embodiment.

BRIEF DESCRIPTION OF THE DRAWINGS

Reference is made to the accompanying drawings, in which:

FIG. 4 is a fragmentary perspective view showing more dearly the hollow cylindrical tool having a free edge carrying teeth in this example, together with its transverse member constituting a shaving-breaker;

FIG. 5 is a view analogous to FIG. 4 in axial section to show more dearly the particular configuration of the transverse member forming a shaving-breaker constituted in this example in the form of a U-shaped strap;

FIG. 6 is a variant of FIG. 5 showing a free edge without teeth, that is essentially smooth with a cutting edge, and in this example also presenting an undulating circumferential profile.

DETAILED DESCRIPTION OF THE INVENTION

Figure 1:
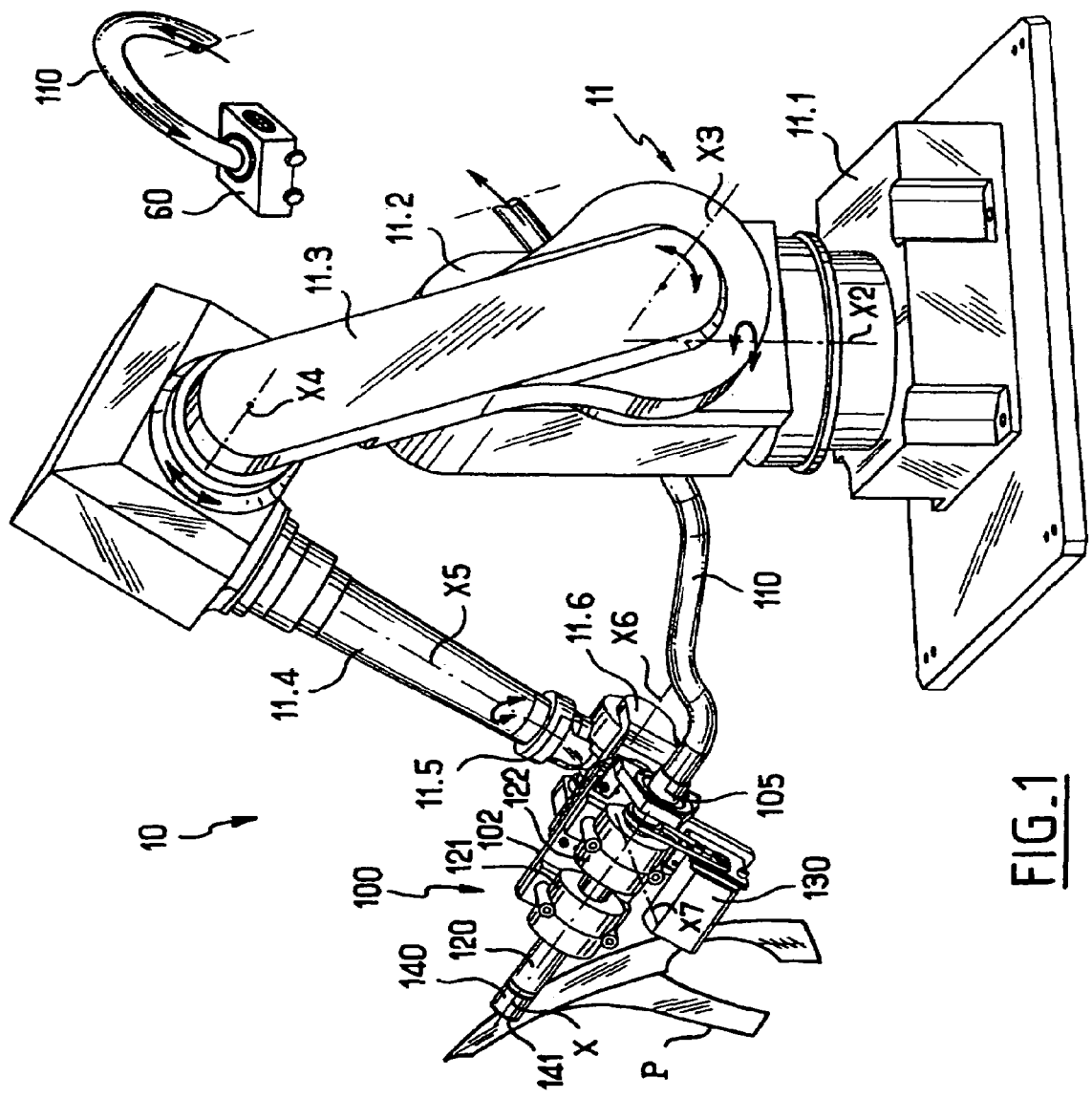
FIG. 1 is a perspective view showing a machining device in accordance with the invention mounted at the end of a hinged arm forming part of a numerically controlled machining robot.

FIG. 1 shows a machining device in accordance with the reference given overall reference 100 that is for use in machining three-dimensional mechanical parts, in particular a part referenced P which in this example is a three-dimensional model of motor vehicle bodywork (specifically a front left fender), the part being machined from a solid piece of polystyrene. The field of application mentioned specifically is that of car design, however that is naturally only an example, it being understood that the invention can be applied to any type of machining of mechanical parts by means of a rotary hollow cylindrical tool.

The machining device 100 in this example is mounted via a pair of plates 101 and 102 to one end of a hinged arm 11 forming part of a numerically controlled machining robot 10.

The hinged arm machining robot has a base 11.1 surmounted by a turret 11.2 capable of turning about an axis X2 that is substantially vertical, which turret is fitted on one side with a pivoting arm 11.3 mounted to turn about an axis X3 that is substantially horizontal. At the other end of the pivot arm 11.3 there is provided another arm 11.4 capable of turning about an axis X4 that is essentially horizontal. At the end of this arm 11.4, there is provided an end 11.5 that is mounted to turn about the central axis X5 of the arm 11.4, which end carries a fork 11.6 mounted to turn about an axis X6. Finally, a tool carrier (not shown in the figures) is mounted on the fork 11.6 with the ability to turn about a central axis X7 that is perpendicular to the plane of said fork, i.e. perpendicular to the axis X6 of said fork 11.6.

The above tool carrier serves in particular to mount the pair of plates 101, 102 on the above-mentioned fork 11.6, which pair of plates serves to carry the machining device 100 that is described in greater detail below.

Naturally, the 6-axis type hinged arm machining robot shown herein is given purely by way of example, and use may be made of any other type of multi-axis hinged arm robot with or without numerical control, or in a variant to provide a moving support system for lighter work that can be carried out directly by an operator (variant not shown herein).

The machining robot having a hinged arm 11 can be controlled so as to position and orient in any desired position in three dimensions the machining device 100, and in particular its hollow cylindrical tool that presents a distal end with a free edge shaped to perform machining when the tool is rotated about its own axis.

Figure 2:
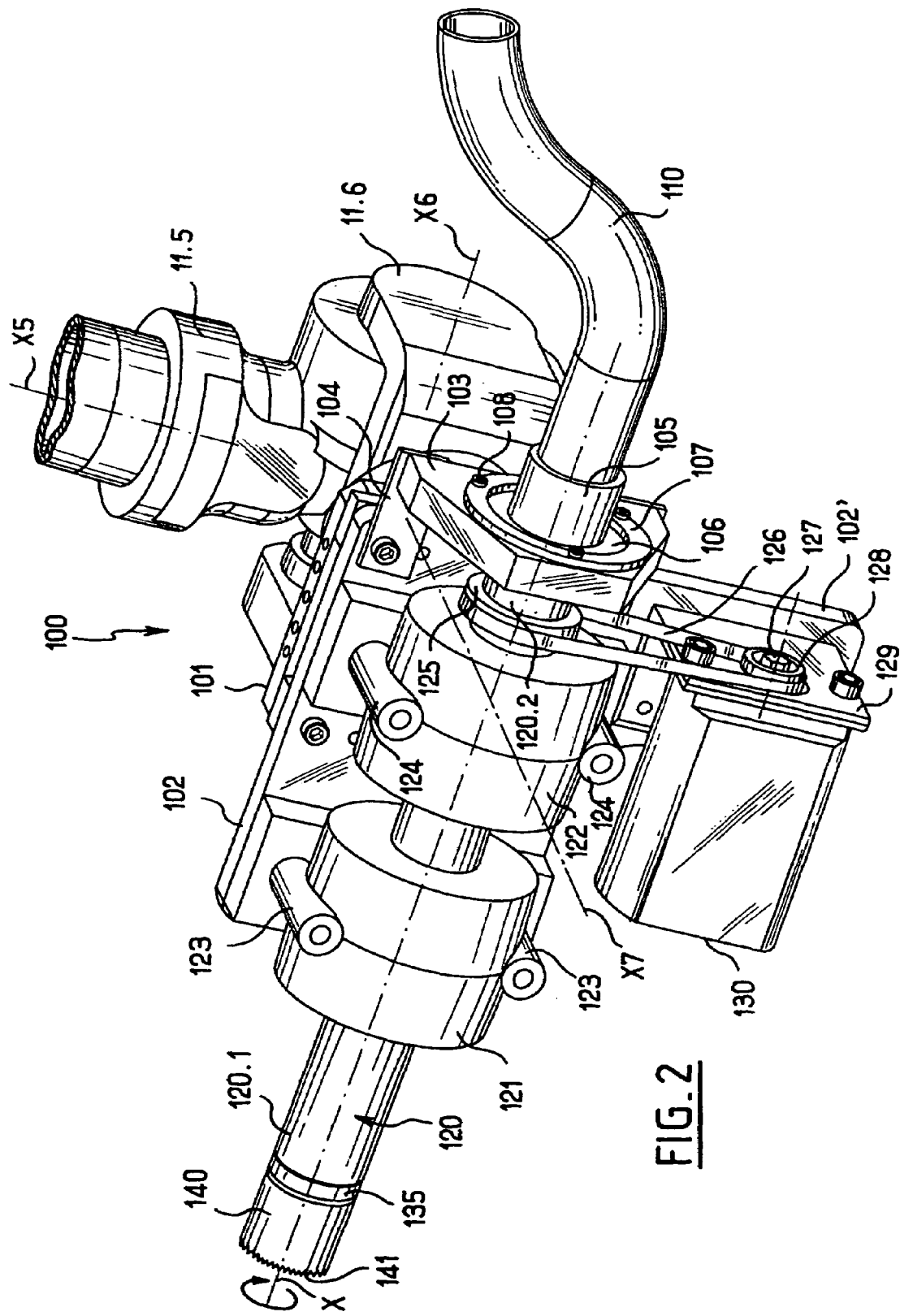
FIG. 2 is a view on a larger scale of the above machining device, in which the essential components can be seen more clearly.
Figure 3:
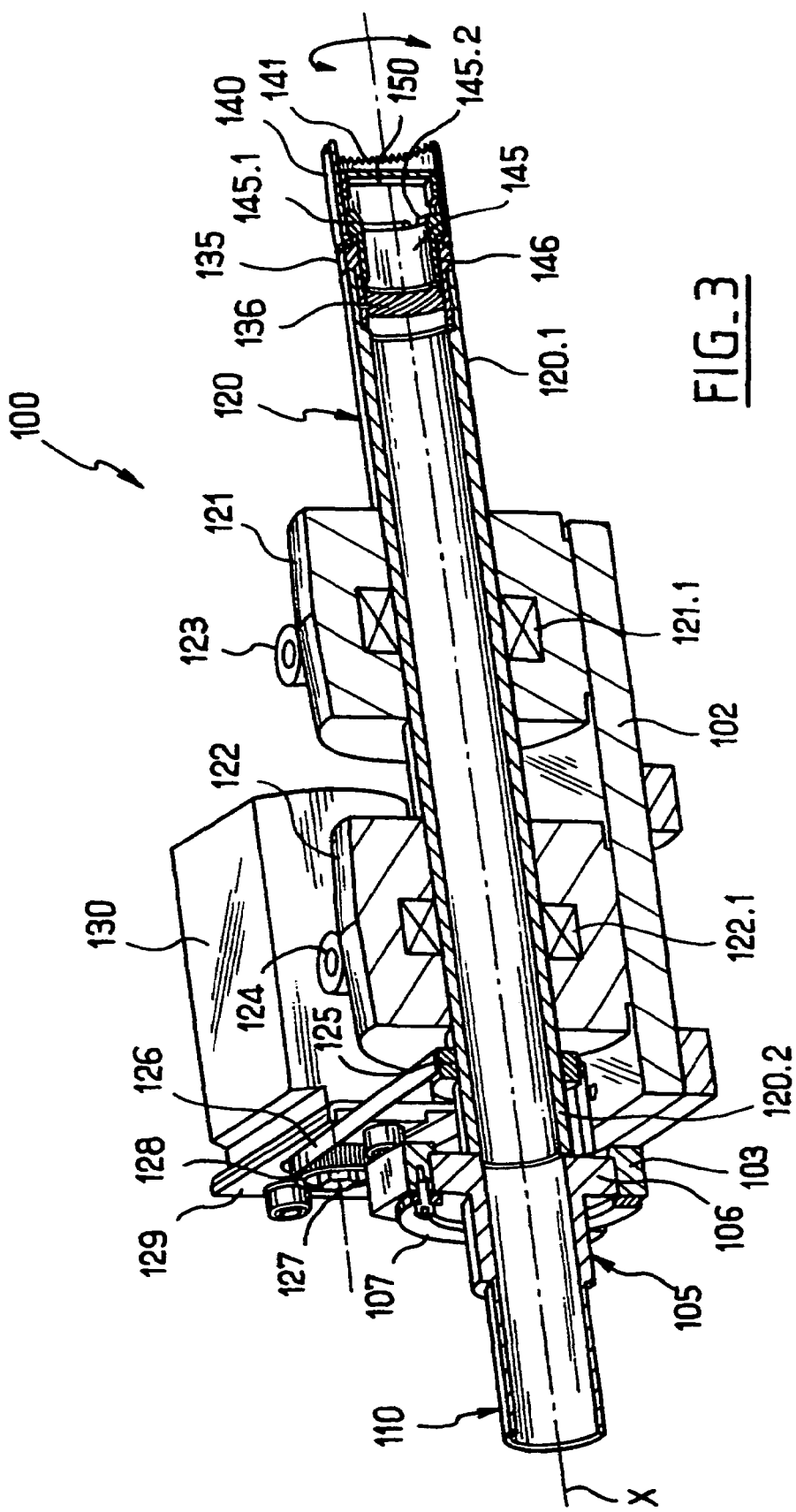
FIG. 3 is a perspective view in axial section of the FIG. 2 device showing clearly how a continuous duct is formed for removing machining shavings merely by suction.

With reference to FIGS. 2 to 4 there follows a description in greater detail of the essential components of the above-described machining device 100.

The machining device 100 comprises a hollow cylindrical tool 140 secured axially on a distal end 120.1 of a hollow cylindrical spindle 120. The hollow cylindrical spindle 120 is mounted to rotate about its own axis X on the support plate 102, being driven externally by rotary drive means mounted on said support plate. Specifically, a system is provided with two bearings 121 and 122 that are spaced apart axially along the axis X in order to support the hollow cylindrical spindle 120 so that it is free to rotate. The bearings 121 and 122 are rigidly secured and prevented from rotating by respective associated fingers 123 and 124 mounted on a fork that is secured to the plate 102. Each bearing 121, 122 contains, for example, a respective central ball bearing 121.1 and 122.1, shown diagrammatically only in FIG. 3. The cylindrical spindle 120 is thus held securely while being capable of rotating about its main axis X.

The hollow cylindrical spindle 120 also presents a proximal end referenced 120.2 that is fitted in this example with a pulley 125 constrained to rotate with said spindle. The plate 102 presents a lateral extension 102' having a bracket 129 mounted thereon supporting an electric motor 130 which is thus mounted laterally to one side of the hollow cylindrical spindle 120. The outlet shaft 127 of the motor 130 is fitted with a pulley wheel 128 with a drive belt 126 passing thereover and also passing over the pulley 125 that is constrained to rotate with the cylindrical spindle 120. The belt may optionally be a cog belt with the pulleys having matching teeth. The motor 130 can thus be controlled to rotate the hollow cylindrical spindle 120 and the associated cylindrical tool 140 at the desired speed.

The hollow cylindrical tool 140 is fitted internally with a transverse member 150 constituting a shaving-breaker so as to guarantee that machining shavings do not exceed a maximum dimension, and thus guarantee that the flow entrained by sucking air through the duct for removing machining shavings is regular.

Unlike traditional machining devices that make use of a machining tool spinning at high speed, e.g. 20,000 rpm, it is possible in this example to be satisfied with speeds of rotation that are much slower, e.g. 500 rpm to 600 rpm, insofar as said speeds are entirely satisfactory for machining, while generating large shavings that are removed as the machining advances. Given the low forces and small speeds of rotation involved, it is possible to be satisfied with low-power electric motors, e.g. motors of about 300 watts (W), which motors are inexpensive and above all light in weight.

The proximal end 120.2 of the hollow cylindrical spindle 120 faces and is directly adjacent to a hollow cylindrical endpiece 105 secured to the support plate 102 and connected to a suction hose 110.

Specifically, a bracket 103 is provided that is secured via tabs 104 to the plate 102, which bracket carries the endpiece 105 via a cylindrical base 106 thereof, which base is secured by a ring 107 held by bolts 108.

The cylindrical endpiece 105 is extended by a suction hose 110 that serves to evacuate machining shavings, possibly all the way to a site that is remote from the rotor. Naturally, provision could be made for the endpiece 105 to be connected via releasable means to the suction hose 110, or for said endpiece to form an integral part of the hose 110.

By means of such an arrangement, the machining shavings can be removed internally by passing in succession through the hollow cylindrical tool 140, going round the transverse member 150 forming a shaving-breaker, along the hollow cylindrical spindle 120, into the hollow cylindrical endpiece 105, and into the suction hose 110.

FIG. 1 shows diagrammatically a suction installation represented by a suction fan 60 having the other end of the suction hose 110 mounted thereto. Naturally, it is possible to use any type of suction hose of flexible and corrugated shape made of plastics material, which hose may possibly run along walls and/or the ceiling of the worksite, so as to make use of suction members at a location that is remote from the machining. In quite surprising manner, such an arrangement is entirely suitable for removing machining shavings as the part is being machined, such that the site where machining is taking place remains particularly dean. In addition, using a small electric motor of low power makes it possible to operate with very little noise, and in particular mention can be made of a noise level of about 78 decibels (dB), which is quite remarkable and means that people can be present on the site where machining is taking place without being inconvenienced in any way while machining proper is taking place.

As can be seen more dearly in the section of FIG. 3, it is advantageous to provide for the hollow cylindrical tool 140, the hollow cylindrical spindle 120, the hollow cylindrical endpiece 105, and the suction hose 110 to present substantially the same inside diameter so as to form an essentially continuous removal duct for the machining shavings. This is naturally not essential in any way, but having an inner duct that is continuous serves to avoid having any variations in section that could interfere with the continuous flow of sucked-up shavings removed via said duct.

FIG. 3 also shows more dearly how the hollow cylindrical tool 140 is secured releasably on the distal end 120.1 of the hollow cylindrical spindle 120.

There can be seen a terminal sleeve 135 which is permanently secured, e.g. as an interference fit, to the distal end 120.1 of the hollow cylindrical spindle 120, pressing against an externally visible collar, which sleeve 135 presents an inside thread 136. A hollow screw 145 presenting an outside thread 146 can thus be screwed into the sleeve 135 and can hold the hollow cylindrical tool 140 via its collar 145.1. Specifically, the hollow screw 145 presents terminal studs 145.2 that enable it to be driven by means of a stud wrench that is passed inside the hollow cylindrical tool 140. It is thus possible to assemble and disassemble a machining tool quickly, particularly when it is desired to change the type of machining, and to change between a tool having one set of teeth to a tool presenting a different set of teeth or a tool having no teeth at all at the free edge 141 of said tool.

The detail view of FIG. 4 shows clearly the transverse member 150 constituting a shaving-breaker, which transverse member is constituted in this example by a U-shaped strip. The arrangement and the shape of the strip 150 can be seen more dearly in the section of FIG. 5. There can thus be seen side limbs 153 extending axially against the inside surface of the hollow cylindrical tool 140, e.g. being capable of being held therein merely by the resilience of spring material, or in a variant by mechanical fastener means (not shown herein). The central limb referenced 151 forms a transverse blade for cutting shavings sucked into the tool 140. It is advantageous to provide a sharp edge 152 on at least a fraction of the length of the central limb 151. The U-shaped strip 150 should generally be located at a short distance from the active machining edge 141, in this case constituted by a set of teeth. Thus, as soon as shavings form inside the hollow cylindrical tool 140, the shavings are immediately subjected to the action of the shaving-breaker member 150, and can then be removed quite naturally.

In a variant, as shown in FIG. 6, it is possible to provide a shaving-breaker member constituted by a bar 150' extending diametrically inside the hollow cylindrical tool 140, with a leading edge 151', said bar being secured via heads 153' to the inside wall of the hollow cylindrical tool 140. FIG. 6 also shows a variant shape for the free edge 141 of the cylindrical tool 140, with this variant free edge, referenced 141', being essentially smooth with a cutting edge. This smooth free edge 141' may present a circumferential profile that is linear, or in a variant and as shown in FIG. 6, it may present a circumferential profile that is undulating, presenting periodic ridges 141'.1 like a meat grinder, so as to avoid any risk of material adhering to the inside face of the active smooth edge.

Figure 7:
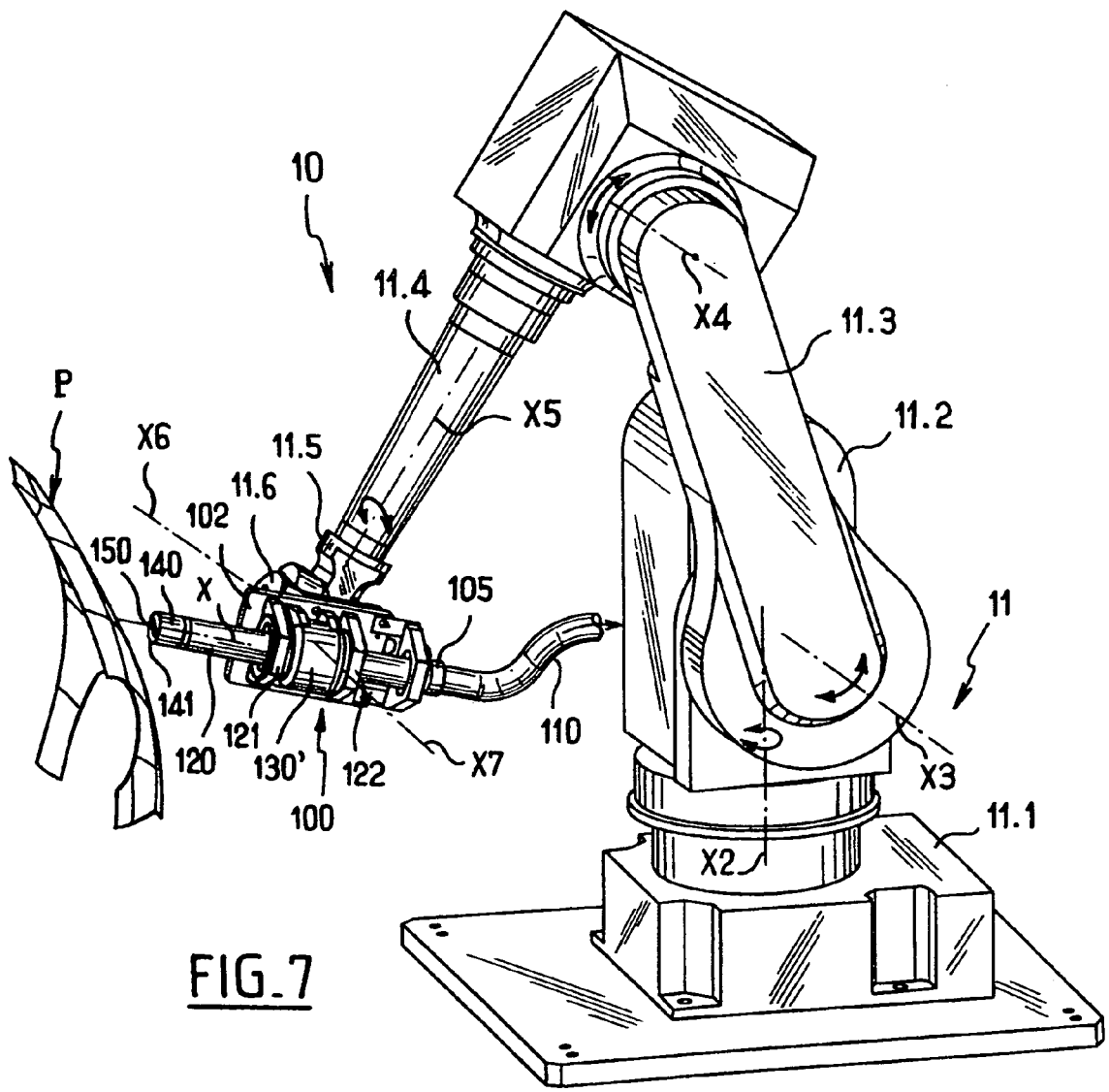
FIG. 7 is a perspective view analogous to that of FIG. 1, showing a variant in which the rotary drive means are constituted by a motor of the type having a hollow shaft, that specifically constitutes the hollow cylindrical spindle itself.

In the embodiment described above, the rotary drive means are constituted by a motor 130 mounted laterally to one side of the hollow cylindrical spindle 120. In a variant, it is possible to provide a different configuration, as shown in FIG. 7.

In this figure, the rotary drive means are constituted by a motor 130' of the type having a hollow shaft, the hollow shaft constituting the hollow cylindrical spindle 120 itself. Under such circumstances, the motor 130' is secured to the plate 102 between the two bearings 121 and 122 that support the hollow cylindrical spindle 120, thus providing a configuration that is more compact. The fact that the hollow cylindrical spindle constitutes the hollow shaft driven by the motor 130' then makes it possible to organize removal of machining shavings by suction in the same manner.

Naturally, under all circumstances, it is appropriate to provide as small a gap as possible between the free edge of the proximal end 120.2 of the cylindrical spindle 120 and the facing free edge forming part of the hollow cylindrical endpiece 105. Here there is a rotary member facing a stationary member, said members constituting complementary parts forming an essentially continuous removal duct, so it is necessary to avoid any unwanted passage of shavings through the gap between the stationary part and the moving part, and it is also necessary to avoid any loss of suction power used for sucking in the machining shavings.

A machining device is thus provided that presents extremely high performance, making it possible to work with materials that are relatively fragile such as polystyrene, while operating at low speeds of rotation, e.g. of the order of 500 rpm to 600 rpm, and with drive power that is likewise modest, e.g. about 300 W. Work takes place at an extremely low level of noise that does not constitute any kind of inconvenience for nearby personnel. Finally, continuous removal of machining shavings without the presence of particles that are charged with static electricity makes it possible to achieve a machining site that is extremely dean and consequently very satisfactory.

The invention is not limited to the embodiments described above, but on the contrary covers any variant using equivalent means to reproduce the essential characteristics specified above.

Although not described herein, provision can be made for example to equip the terminal fork 11.6 on the hinged arm 11 with additional equipment (not shown), such as a sander, thus making it possible merely by disconnecting the suction hose 110 from the machining device 100 and reconnecting said hose on the accessory such as a sander, and merely by pivoting the terminal fork, to obtain finishing equipment that is immediately available in the vicinity of the part that has just been machined.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A device for machining mechanical parts by means of a hollow cylindrical tool presenting a distal end with a free edge that is shaped to perform machining when said tool is rotated about its axis, wherein the hollow cylindrical tool is fitted internally with a transverse member forming a shaving-breaker, and said hollow cylindrical tool is secured axially to a distal end of a hollow cylindrical spindle, said hollow cylindrical spindle being mounted to rotate about its own axis on a support plate, and being driven externally by rotary drive means mounted on said support plate, and said hollow cylindrical spindle having a proximal end facing and directly adjacent to a hollow cylindrical endpiece secured to said support plate and connected to a suction hose, such that the machining shavings can be evacuated internally by passing successively through the hollow cylindrical tool going round the transverse member forming a shaving-breaker, through the hollow cylindrical spindle, through the hollow cylindrical endpiece, and through the suction hose.

2. The device according to claim 1, wherein the transverse member forming a shaving-breaker is constituted by a U-shaped strip with side limbs extending axially over the inside surface of the hollow cylindrical tool, and with a central limb in the form of a transverse blade for cutting shavings sucked into said tool.

3. The device according to claim 1, wherein the transverse member forming a shaving-breaker is constituted by a bar extending diametrically inside the hollow cylindrical tool.

4. The device according to claim 1, wherein the hollow cylindrical tool, the hollow cylindrical spindle, the hollow cylindrical endpiece, and the suction hose present substantially the same inside diameter, so as to form a removal dud that is essentially continuous for the machining shavings.

5. The device according to claim 1, wherein the free edge of the hollow cylindrical tool presents a set of teeth.

6. The device according to claim 1, wherein the free edge of the hollow cylindrical tool is essentially smooth with a cutting edge.

7. The device according to claim 6, wherein the smooth free edge presents a circumferential profile that is linear.

8. The device according to claim 6, wherein the smooth free edge presents a circumferential profile that is undulating.

9. The device according to claim 1, wherein the rotary drive means are constituted by a motor mounted laterally to one side of the hollow cylindrical spindle, together with a belt connecting said spindle to the outlet shaft of said motor.

10. The device according to claim 1, wherein the rotary drive means are constituted by a motor of the hollow shaft type, which hollow shaft constitutes the hollow cylindrical spindle itself.

11. The device according to claim 1, the device being mounted on a plate at the end of a hinged arm forming part of a numerically controlled machining robot.

\* \* \* \* \*

UNITED STATES PATENT AND TRADEMARK OFFICE
CERTIFICATE OF CORRECTION

| | | |
|---|---|---|
| PATENT NO. | : 7,419,341 B2 | Page 1 of 1 |
| APPLICATION NO. | : 11/475525 | |
| DATED | : September 2, 2008 | |
| INVENTOR(S) | : Romain Granger | |

It is certified that error appears in the above-identified patent and that said Letters Patent is hereby corrected as shown below:

Column 8, Claim 4, line 40, please delete "dud" and insert -- duct --.

Signed and Sealed this

Sixteenth Day of December, 2008

JON W. DUDAS
*Director of the United States Patent and Trademark Office*